US006158715A

United States Patent [19]

Kirschbaum

[11] Patent Number: 6,158,715

[45] Date of Patent: Dec. 12, 2000

[54] METHOD AND ARRANGEMENT FOR THE ELECTROMAGNETIC CONTROL OF A VALVE

[75] Inventor: Frank Kirschbaum, Stuttgart, Germany

[73] Assignee: DaimlerChrysler AG, Stuttgart, Germany

[21] Appl. No.: 09/311,592

[22] Filed: May 14, 1999

[30] Foreign Application Priority Data

May 14, 1998 [DE] Germany ........................... 198 21 548

[51] Int. Cl.$^7$ ........................ F16K 31/02

[52] U.S. Cl. ........................ 251/129.06; 361/160; 361/187

[58] Field of Search ........................ 251/129.06, 129.01; 361/160, 170, 187, 206

[56] References Cited

U.S. PATENT DOCUMENTS

| | | | |
|---|---|---|---|
| 5,804,962 | 5/1999 | Kather et al. | 324/207.16 |
| 5,905,625 | 5/1999 | Schebitz | 361/154 |

FOREIGN PATENT DOCUMENTS

| | | |
|---|---|---|
| 0 662 697 A1 | 7/1995 | European Pat. Off. . |
| 0 727 566A2 | 8/1996 | European Pat. Off. . |
| 37 33 704 A1 | 4/1988 | Germany . |
| 195 21 078 A1 | 12/1996 | Germany . |
| 195 30 394 A1 | 2/1997 | Germany . |
| 196 23 698 A1 | 12/1997 | Germany . |

*Primary Examiner*—Kevin Shaver
*Assistant Examiner*—David A. Bonderer
*Attorney, Agent, or Firm*—Evenson, McKeown, Edwards & Lenahan, P.L.L.C.

[57] ABSTRACT

In a method and apparatus for controlling a valve with an electromagnetically operable valve element, when an assigned solenoid is energized by means of a capturing current pulse, the valve element is moved against an elastic restoring force into a stop-defined end position, and reaches the end position at an impact velocity which is controlled by variable adjustment of the capturing current pulse. The impact velocity is controlled by means of a minimal-value control, in which, as the switch-on point in time of the capturing current pulse for a next valve operation, that of a preceding operation plus a control increment is selected, which is defined as a minimum target function of the gradient of the impact velocity determined from preceding operating cycles, as a function of the switch-on point in time.

4 Claims, 2 Drawing Sheets

METHOD AND ARRANGEMENT FOR THE ELECTROMAGNETIC CONTROL OF A VALVE

BACKGROUND AND SUMMARY OF THE INVENTION

This application claims the priority of 198 21 548.7, filed May 14, 1998, the disclosure of which is expressly incorporated by reference herein.

The invention relates to a method and apparatus for controlling a valve having an electromagnetically operable valve element. When an assigned solenoid is energized by a capturing current pulse, the valve element is moved against an elastic restoring force into a stop-defined end position, reaching the end position at a pertaining impact velocity which is controlled by the variable adjustment of the capturing current pulse.

Valves having an electromagnetically operable valve element are used, for example, as charge cycle valves for internal-combustion engines of motor vehicles. Typically such valves have two oppositely spaced solenoids which operate as switching magnets, one forming an opening magnet and the other forming a closing magnet, and an armature provided on the valve element is movably arranged between pole surfaces of the solenoids. An assigned spring arrangement, usually in the form of two prestressed pressure springs, together with the valve element, forms a spring-ground oscillator, whose rest position is between the two valve end positions. From the rest position, the valve gear is attracted by the closing magnet or by the opening magnet, to move against the elastic restoring force of the spring arrangement into the pertaining end position. Subsequently, the valve is alternately opened and closed by switching off the energizing of the momentarily stopped magnet so that the valve gear is accelerated by the spring arrangement from the previous end position toward the rest position. The valve element moves beyond the rest position, and is then captured by the opposite solenoid against the elastic restoring force of the spring arrangement. For this purpose, it is acted upon by a so-called capturing current pulse. The thus captured valve element will then reach its new, stop-defined end position at an impact velocity which is a function of the capturing current pulse.

Such valves are increasingly important for internal-combustion engines with a variable valve timing, which can achieve a high efficiency, while emissions remain relatively low.

German Published Patent Applications DE 37 33 704 A1 and DE 195 30 394 A1 disclose control methods for such charge cycle valves, in which individual stick times of the armature on the respective solenoids are taken into account, or it is monitored (by detecting the current course and/or voltage course for energizing the solenoid) whether the valve element is being held at rest against its pole surface.

German Published Patent Application DE 196 23 698 A1 discloses a method for controlling such a charge cycle valve as a function of the timing and/or velocity of the impact of the valve element capturing operation. Oscillation signals generated by the valve gear are detected and the valve is controlled as a function of the extent of the detected oscillation signals. In one variation, this method corresponds to the type initially mentioned in that the impact velocity is controlled to ensure secure valve operation on the one hand, and to minimize noise and energy consumption for the valve gear on the other hand, while at the same time, manufacturing tolerances and influences of wear and temperature are compensated. For this purpose, detected vibration signals are used to determine the impact velocity, which is controlled by variable selection of the switch-on time and possibly of the current intensity of the capturing current pulse. Such control is performed by reading desired values from previously stored characteristic diagrams a valve operating mechanism. The desired values thus determined can be modified in the course of the operation, and modified desired values are stored in a characteristic adaptation diagram which can be updated. When a deviation is detected, a correspondingly changed capturing current is set for the next valve operation.

Additional methods and arrangements for valve control with a variable selection of the switch-on point in time of a capturing coil are disclosed in German Published Patent Application DE 195 21 078 A1 and European Published Patent Application EP 0 662 697 A1.

An object of the invention is to provide a method and apparatus of the initially mentioned type for controlling an electromagnetically operable valve, with low-wear and low-noise, while ensuring a secure capturing of the valve element by the solenoid.

Another object of the invention is to provide such a method and apparatus which, in particular, are suitable for variable valve timing in the case of internal-combustion engines.

These and other objects and advantages are achieved by the valve control method according to the invention, in which the impact velocity is controlled to a minimal value. For this purpose, the switch-on point in time of the capturing current pulse is determined based on the gradient of the impact velocity, and can be varied to achieve a minimal impact velocity. This approach is based on the recognition that, if the switch-on point of the capturing current pulse is varied while the parameters otherwise remain the same, the impact velocity curve passes through a minimum.

The present invention automatically adjusts the valve operation to achieve the minimal impact velocity by adjusting the the pertaining switch-on point to a value, which in the following will be called "optimal", for the capturing current pulse. This is achieved by an iterative process in which the switch-on time for a next capture of the valve element is determined from the previous switch-on point, by the addition of a control increment which is defined as a minimum target function dependent on the above-mentioned velocity gradient. In this case, the minimum target function is any function which changes the switch-on point for the capturing current pulse toward the optimal target value which leads to the minimal impact velocity. This includes particularly functions with a negative zero crossing; that is, in which the gradient curve extends with a negative ascent through the coordinate zero point. This ensures that the control will always find the operating point of minimum impact velocity for the life of the valve, independently of possibly variable interference influences, such as friction or temperature. A storage and operation-dependent modification of characteristic diagrams for the diverse parameters of the valve control is therefore not absolutely necessary for this purpose.

According to a feature of the invention, the functional dependence of the control increment on the velocity gradient is specially selected so that, on the one hand, it can be implemented and constructed at low expenditures and, on the other hand, it permits a fast reaction of the control to deviations from the minimal impact velocity.

According to another feature of the invention, the impact velocity is advantageously obtained from a time-dependent measurement of the valve element operating path. For this purpose, a corresponding valve element path sensor system is provided. In this manner, the impact velocity can be determined with reasonable precision.

Other objects, advantages and novel features of the present invention will become apparent from the following detailed description of the invention when considered in conjunction with the accompanying drawings.

DETAILED DESCRIPTION OF THE DRAWINGS

Figure 1:
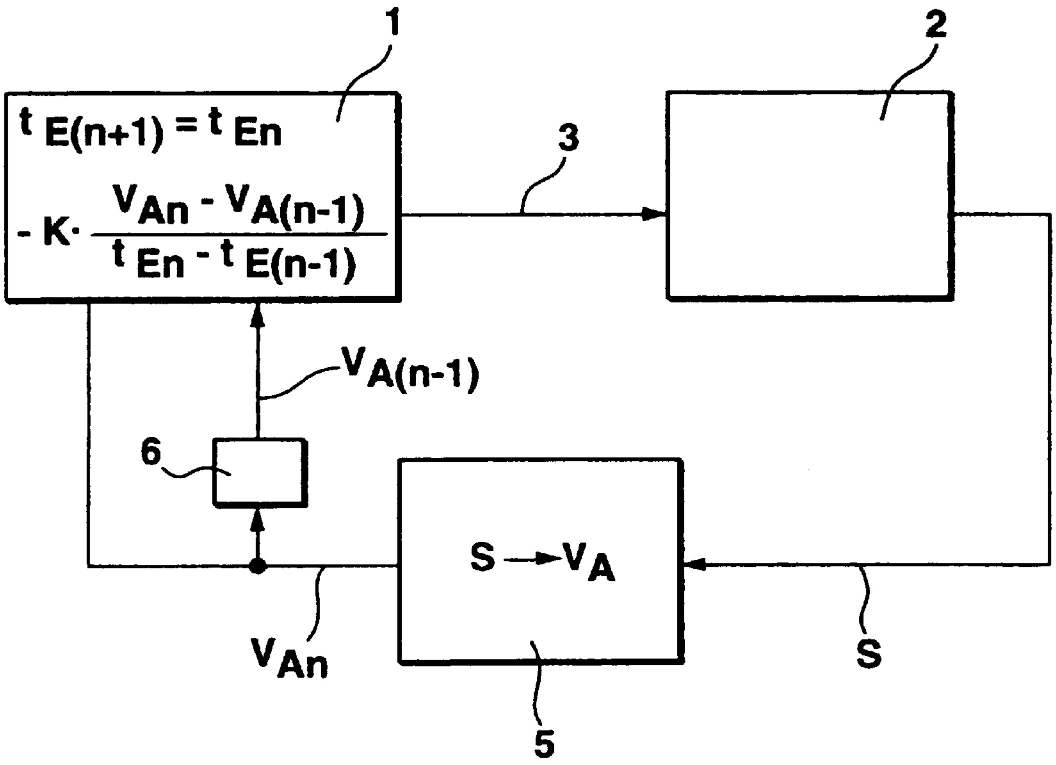
FIG. 1 is a schematic block diagram of an arrangement according to the invention for controlling a valve with an electromagnetically operable valve element in the form of an impact velocity control circuit.

The arrangement schematically illustrated in FIG. 1 is used to control a valve having an electromagnetically operable valve element, particularly a charge cycle valve for an Otto engine with variable valve timing. The valve itself is of a conventional construction, in which the valve element, together with an assigned spring arrangement, forms a spring-ground oscillator and can be moved back and forth (that is, switched over) between two end positions by way of an armature and two opposite solenoids. For this purpose, the valve element is held in the respective end position by the solenoid which is situated there (and which is acted upon by a holding current), and is released by interruption of the holding current, so that it is moved by the effect of the spring arrangement in the direction of the other end position. After the valve element has passed through its rest position defined by the spring arrangement, the spring arrangement will counteract its further movement and thus reduce the impact effect. To assure that the valve element nevertheless reaches the other end position in a rapid and reliable manner, the solenoid situated at the other end position is acted upon by a capturing current pulse at a suitable switch-on point in time. It thus attracts the valve element by means of a resulting capturing force until the latter impacts on the end stop situated there. In order to hold the valve element there, only a holding force is required, which is lower than the capturing force. In order to provide such a holding force the energizing of the solenoid is changed from the capturing current pulse, with a higher current intensity, to a subsequent holding current phase having a lower current intensity.

Based on the conventional valve control described thus far, the arrangement of FIG. 1, controls the velocity at which the valve element impacts on the respective end stop. The control device according to FIG. 1 is designed as an impact velocity—minimal value control circuit, which adjusts to achieve a minimal impact velocity by variable adjustment of the capturing current switch-on point in time.

Figure 2:
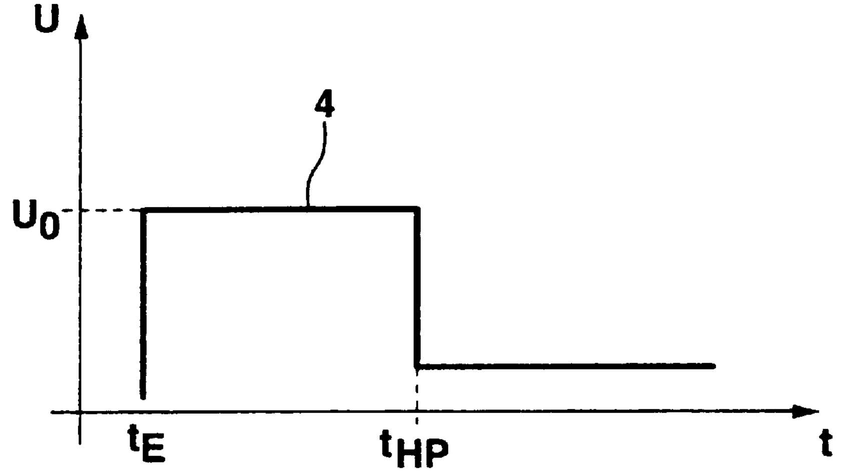
FIG. 2 is a voltage-time diagram which illustrates a capturing current pulse used in the arrangement of FIG. 1.

For this purpose, the control circuit of FIG. 1 has an impact velocity controller 1 which emits an adjusting signal 3 to the valve 2 to be controlled, particularly to its electromagnetic valve element driving part. The adjusting signal 3 contains particularly the adjusting information for the respective capturing current pulse. For example, a sequence of individual clock pulses or an individual rectangular pulse may be provided as the capturing current pulse, as illustrated schematically in FIG. 2. In the illustrated example, the voltage amplitude $U_0$ of the rectangular pulse of the capturing current is held constant, and only its switch-on point $t_E$ is varied in order to control the impact velocity. In this case, the switch-on point $T_E$ must be related to a reference point which is fixed for every valve switching operation, for example, to the start of a switch-over operation from the opening into the closing end position of valve 2. Relative to its reference point, the point $t_{Hp}$ of the start of the respective holding current phase is kept constant, with a reduced holding voltage illustrated in FIG. 2.

Figure 3:
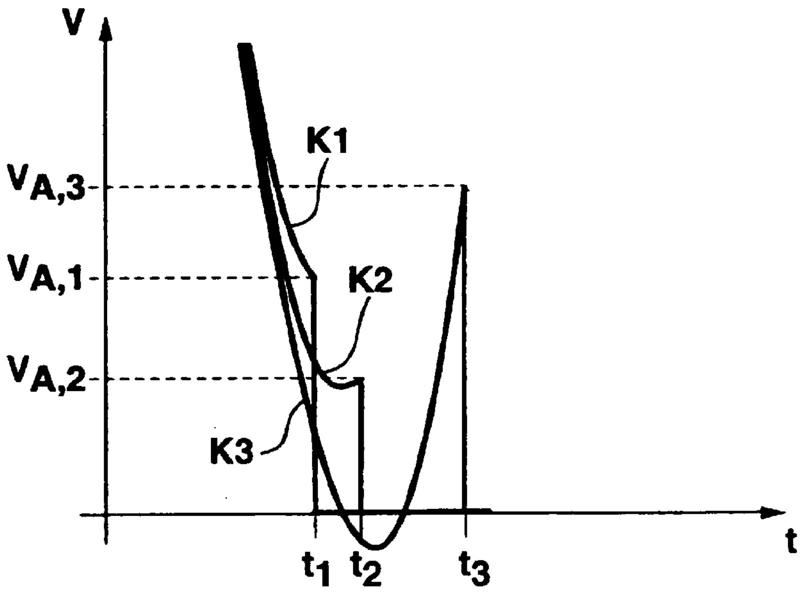
FIG. 3 is a velocity-time diagram which illustrates the valve element velocity course for different capturing current pulses.

By means of simulation results, FIG. 3 illustrates the effect of varying the switch-on point in time of the capturing current pulse on the time-related course of the valve element velocity v during a capturing phase, while the system parameters are otherwise kept constant. A first characteristic curve K1 shows the valve element velocity when a switch-on point is too early by 0.05 ms with respect to an optimal switch-on point in time. As the result of the early attracting influence of the capturing solenoid, the braking effect of the elastic restoring spring forces is counteracted correspondingly early, and the valve element still has a relatively high impact velocity $v_{A,1}$ at the time $t_1$ when it impacts on the pertaining end stop. In addition, immediately afterwards, wear-increasing rebounding vibration effects will occur until the valve element will finally remain in the holding position.

A second characteristic curve K2 illustrates the optimal case in which the capturing current pulse is switched on at a point in time $t_2$, such that the valve element impacts at a minimally achievable impact velocity $V_{A,2}$ against the end stop. Finally, a third characteristic curve K3 illustrates a capturing current pulse switch-on time which is 0.06 ms later than the optimal switch-on point in time. As a result, the valve element is braked by the spring arrangement to a stop and is subsequently accelerated in the opposite direction until its movement is reversed again by the capturing force of the capturing solenoid. However, since previously the valve element had already moved away again from the pertaining end position, it will finally impact on the end position stop at an increased impact velocity $v_{A,3}$ at a point in time $t_3$.

Figure 4:
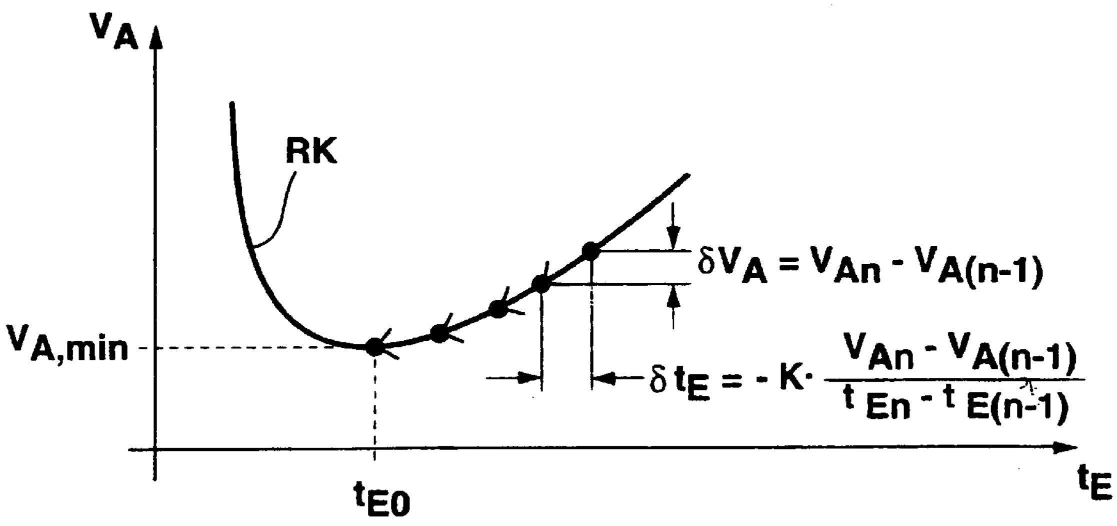
FIG. 4 is an impact velocity-capturing current switch-on time diagram which illustrates a characteristic control curve used by the arrangement of FIG. 1.

A complete analysis of the example illustrated in FIG. 3 shows that when the capturing current pulse switch-on point $t_E$ is varied while the system parameters are otherwise held constant, the valve element impact velocity $v_A$ changes according to a characteristic curve RK illustrated in FIG. 4. As illustrated in FIG. 4, the impact velocity $v_A$ defined by this characteristic curve RK, as a function of the capturing current pulse switch-on point $t_E$ has a minimum $V_{A,min}$ with a pertaining optimal switch-on point in time $t_{E0}$. This characteristic curve RK of FIG. 4 is used by the impact velocity control circuit of FIG. 1 as a characteristic control curve RK for a minimal-value control, which will be discussed in the following.

To control the impact velocity, the control circuit of FIG. 1 contains a velocity determination unit 5 which comprises a path sensor system, by means of which the operating paths of the valve element is measured continuously. From the measured time-related valve element moving path courses, the velocity determination step 5 determines the pertaining velocity course of the valve element and, from it, its impact velocity $v_A$ for each operating cycle (that is, each switch-over operation). As an example, FIG. 1 illustrates the point in time at which the velocity determination step 5 has determined the impact velocity $v_{An}$ for an n-th operating cycle, and the impact velocity controller 1 calculates the capturing current pulse switch-on point in time $t_{E(n+1)}$ for the next, (n+t)-th operating cycle, n being an arbitrary integer.

The function block of the controller 1 of FIG. 1 indicates the control algorithm used for this purpose. Each respective capturing current pulse switch-on point in time $t_{E(n+1)}$ is determined as the sum of the switch-on point in time $t_{En}$ selected for the preceding operating cycle and of a control increment $\delta t_E$, which is determined as the negative product of a positive adaptive factor K with the quotient $(v_{An}-v_{A(n-1)})/(t_{En}-t_{E(n-1)})$ of the difference of the impact velocities in the preceding n-th operating cycle and in the next-to-the-last, (n−1)-th operating cycle with respect to the difference of the corresponding capturing current pulse switch-on points in time $t_{En}$, $t_{E(n-1)}$; that is, the following relationship applies $$t_{E(n+1)}=t_{En}+\delta t_E=t_{En}-K\cdot(v_{An}-v_{A(n-1)})/(t_{En}-t_{E(n-1)}).$$

In other words, the control increment $\delta t_E$ corresponds to the product of the adaptive factor K with the gradient $(dv_A/dt_E)$ of the valve element impact velocity $v_A$ as a function of the capturing current pulse switch-on point in time $t_E$, resulting from the last two valve element operating cycles. A delay element 6 is used for the intermediate storage of the information concerning the impact velocity $v_{A(n-1)}$ in the respective second-to-last operating cycle.

The switch-on point in time, $t_E$ is therefore varied by the control according to a control increment $\delta t_E$, which is defined as a minimal target function in the sense of the above definition, especially as a function with a negative zero crossing, dependent on this gradient. This ensures the desired minimal-value control characteristic; that is, the control automatically finds the minimum valve element impact velocity $v_{A,min}$ in the respective situation in steps from one operating cycle to the next. This process is represented in FIG. 4 by corresponding control step arrows on the characteristic control curve RK as an example, in which the switch-on point in time initially is too high (that is, too late). As a result of the negative zero crossing characteristic of the functional relationship between the control increment $\delta t_E$ and the gradient $(dv_A/dt_E)$ of the characteristic control curve RK in the sense of the above definition, it is ensured that the control about the desired working point of minimal impact velocity $v_{A,min}$ operates in a stable manner at the optimal capturing current pulse switch-on point in time $t_{E0}$. That is, upon deviations on both sides, it again aims toward this working point and remains there as long as no interfering influences are in effect.

In order to speed up the impact velocity control (that is, to eliminate occurring deviations as fast as possible), the factor K is preferably adaptively determined such that, as a function of the gradient of the characteristic control curve RK, it increases with increasing gradient. On the other hand, the factor value K is selected to be not too large in order to avoid occurring control vibration effects.

It is understood that the gradient of the valve element impact velocity as a function of the capturing current pulse switch-on point in time relevant to the present control can be determined not only by means of the values of the two last operating cycles as described above, but as an alternative, in a different manner; for example, using values of the impact velocity and/or of the switch-on point in time which were averaged over more than two preceding operating cycles.

As an alternative to the above-mentioned control algorithm, other control algorithms can also be used, in which case it must only be ensured that they lead to the desired minimal-value control. Thus, the factor K can also be defined as a fixed factor which is not dependent on the characteristic control curve gradient. In addition, the control increment can be defined as an arbitrary minimum target function dependent on the control gradient which ensures that a stable control action exists with a reliable reaching of the working point of minimal impact velocity $v_{A,min}$ in a sufficiently large environment of the latter working point.

As illustrated by the above explanation of an embodiment, the minimal-value control according to the invention achieves an impact velocity of the valve element which is as low as possible, while also reliably reaching its end positions in an automatic manner also in the event of occurring interference values, such as age-caused changes of the frictional relationships. The invention can naturally also be applied to valves whose valve control element is captured only in one end position in the described manner by a solenoid.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. For an electromagnetically operable valve element which is moved against an elastic restoring force by means of a capturing current pulse, which energizes an assigned solenoid, into an end position defined by a stop element, reaching an impact velocity, a method for controlling said impact velocity, comprising:

determining a switch-on point in time for the capturing current pulse for each valve operation cycle, which determined switch on point in time is equal to a switch-on point in time for a preceding valve operation cycle plus a control increment, defined as a minimum target function of a gradient of impact velocity with respect to switch-on point in time based on preceding operation cycles; and adjusting a switch-on point in time of the capturing current pulse for each valve operation to equal said determined switch on point in time.

2. Method according to claim 1, wherein-the control increment is defined as a negative of the product of a velocity gradient multiplied with a positive factor which, in turn, is adaptively determined by a function with increases with an increasing value of the gradient.

3. Method according to claim 2, wherein for determination of the valve element impact velocity, a time sequence of a valve element operating path during a respective operating process is measured and the impact velocity is determined therefrom.

4. Method according to claim 1, wherein for determination of the valve element impact velocity, a time sequence of a valve element operating path during a respective operating process is measured and the impact velocity is determined therefrom.

* * * * *